United States Patent
Parekh et al.

(10) Patent No.: US 12,475,994 B2
(45) Date of Patent: Nov. 18, 2025

(54) DEVICES AND METHOD FOR BLOOD VESSEL OCCLUSION

(71) Applicant: Front Line Medical Technologies Inc., London (CA)

(72) Inventors: Asha Parekh, London (CA); Adam Power, London (CA)

(73) Assignee: Front Line Medical Technologies Inc., London (CA)

( * ) Notice: Subject to any disclaimer, the term of this patent is extended or adjusted under 35 U.S.C. 154(b) by 0 days.

(21) Appl. No.: 18/008,744

(22) PCT Filed: Jun. 17, 2022

(86) PCT No.: PCT/CA2022/050976
§ 371 (c)(1),
(2) Date: Dec. 7, 2022

(87) PCT Pub. No.: WO2022/261783
PCT Pub. Date: Dec. 22, 2022

(65) Prior Publication Data
US 2024/0233935 A1    Jul. 11, 2024

(51) Int. Cl.
*G16H 40/20* (2018.01)
*G06K 7/10* (2006.01)
(Continued)

(52) U.S. Cl.
CPC ......... *G16H 40/20* (2018.01); *G06K 7/10366* (2013.01); *G16H 20/40* (2018.01);
(Continued)

(58) Field of Classification Search
CPC .... G06K 7/10366; G16H 10/60; G16H 20/40; G16H 40/20; G16H 40/67; H04W 4/029; H04W 84/18
See application file for complete search history.

(56) References Cited

U.S. PATENT DOCUMENTS

| 3,435,826 A | 4/1969 | Fogarty |
| 3,467,101 A | 9/1969 | Fogarty |

(Continued)

FOREIGN PATENT DOCUMENTS

| CN | 108853688 B | 7/2021 |
| EP | 0368523 A2 | 5/1990 |

(Continued)

OTHER PUBLICATIONS

Feb. 21, 2023 International Office Action (Serial No. 20945377.8).

(Continued)

*Primary Examiner* — George Manuel
(74) *Attorney, Agent, or Firm* — Forsgren Fisher McCalmont DeMarea Tysver LLP; James M. Urzedowski; Daniel A. Tysver

(57) ABSTRACT

An occlusion assembly for occluding the aorta of a patient is presented. The occlusion assembly includes an elongate shaft of two separate extrusions to which an elastomeric balloon envelope is bonded to an end of each. A support wire extends through the elongates shaft and the balloon envelope. At a distal end of the shaft, the support wire is provided with an atraumatic J-tip. At the proximal end of the shaft the proximal end of the support wire is secured to a proximal hub to give the entire assembly sufficient stiffness to be advanced into the vasculature of the patient. The balloon envelope is pre-molded to have a reverse teardrop or "ice cream cone" like shape and will maintain that general shape throughout inflation to the fully inflated state. If the balloon envelope is over inflated, the balloon envelope will advance distally and proximally (lengthening) along the support wire without damage to the surrounding vessel.

17 Claims, 9 Drawing Sheets

(51) Int. Cl.
    *G16H 20/40*    (2018.01)
    *G16H 40/67*    (2018.01)
    *H04W 4/029*    (2018.01)
    *H04W 84/18*    (2009.01)

(52) U.S. Cl.
    CPC ............ *G16H 40/67* (2018.01); *H04W 4/029* (2018.02); *H04W 84/18* (2013.01)

(56) References Cited

U.S. PATENT DOCUMENTS

| | | | |
|---|---|---|---|
| 4,315,512 | A | 2/1982 | Fogarty |
| 4,323,071 | A | 4/1982 | Simpson |
| 4,327,709 | A | 5/1982 | Hanson |
| 4,439,185 | A | 3/1984 | Lundquist |
| 4,573,470 | A | 3/1986 | Samson |
| 4,582,181 | A | 4/1986 | Samson |
| 4,616,653 | A | 10/1986 | Samson |
| 4,641,654 | A | 2/1987 | Samson |
| 4,646,719 | A | 3/1987 | Neuman |
| 4,821,722 | A | 4/1989 | Miller et al. |
| 4,838,268 | A | 6/1989 | Keith |
| 4,846,174 | A | 7/1989 | Willard |
| 4,906,241 | A | 3/1990 | Noddin |
| 4,940,062 | A | 7/1990 | Hampton |
| 4,946,466 | A | 8/1990 | Pinchuk |
| 5,032,113 | A | 7/1991 | Burns |
| 5,042,985 | A | 8/1991 | Elliott |
| 5,087,246 | A | 2/1992 | Smith |
| 5,135,494 | A | 8/1992 | Engelson et al. |
| 5,209,727 | A | 5/1993 | Radisch, Jr. |
| 5,318,587 | A | 6/1994 | Davey |
| 5,387,225 | A | 2/1995 | Euteneuer |
| 5,441,484 | A | 8/1995 | Atkinson et al. |
| 5,607,394 | A | 3/1997 | Andersen |
| 5,779,688 | A | 7/1998 | Imran |
| 6,056,721 | A | 5/2000 | Shulze |
| 6,129,737 | A | 10/2000 | Hamilton |
| 6,368,301 | B1 | 4/2002 | Hamilton |
| 7,261,205 | B2 | 8/2007 | Cervantes |
| 7,331,463 | B2 | 2/2008 | Hickey |
| 8,088,121 | B2 | 1/2012 | Nishide |
| 8,267,871 | B2 | 9/2012 | Eberhardt |
| 8,398,589 | B2 | 3/2013 | Teeslink |
| 8,888,740 | B2 | 11/2014 | Barbut |
| 9,345,509 | B2 | 5/2016 | Davies |
| 9,474,882 | B2 | 10/2016 | Franklin |
| 10,004,622 | B2 | 6/2018 | Sanati |
| 2007/0167972 | A1 | 7/2007 | Euteneuer |
| 2007/0244501 | A1 | 10/2007 | Horn |
| 2008/0188803 | A1 | 8/2008 | Jang |
| 2012/0296313 | A1 | 11/2012 | Andreacchi et al. |
| 2013/0116654 | A1 | 5/2013 | Dehdashtian |
| 2013/0178711 | A1 | 7/2013 | Avneri et al. |
| 2013/0225997 | A1 | 8/2013 | Dillard et al. |
| 2015/0133892 | A1 | 5/2015 | Joe |
| 2018/0236203 | A1* | 8/2018 | Franklin ............. A61M 25/104 |
| 2019/0076152 | A1 | 3/2019 | Franklin |
| 2019/0083102 | A1 | 3/2019 | Dehdashtian |
| 2019/0105057 | A1 | 4/2019 | Radl |

FOREIGN PATENT DOCUMENTS

| | | |
|---|---|---|
| EP | 0492361 B1 | 7/1992 |
| EP | 2478929 B1 | 7/2012 |
| WO | WO8800844 A1 | 2/1988 |
| WO | WO9213589 A1 | 8/1992 |
| WO | WO9219311 | 11/1992 |
| WO | WO9613297 A1 | 5/1996 |
| WO | WO9630074 | 10/1996 |
| WO | WO0069502 | 11/2000 |
| WO | WO09009472 | 1/2009 |
| WO | WO2011133736 A2 | 10/2011 |
| WO | WO2012018899 A1 | 2/2012 |
| WO | WO2014036530 A1 | 3/2014 |
| WO | WO2016149653 A2 | 9/2016 |
| WO | WO2017210584 A1 | 12/2017 |
| WO | WO2019102269 A2 | 5/2019 |
| WO | WO20033377 A1 | 2/2020 |

OTHER PUBLICATIONS

Nov. 23, 2023 International Office Action (Serial No. 2020458578).
Feb. 26, 2024 International Office Action (Serial No. 20945377.8).
Wiley J. Jinkins III, M.D., "Use of the Fogarty Embolectomy Catheter as an "Internal Tourniquet"", article, pp. 1-4, Jul. 5, 1977, Division of Othopaedic Surgery, The University of Texas Medical Branch.
Suressh Chengod, MD, et al., "Selective Left Bronchial Intubation and Left-Lung Isolation in Infants and Toddlers: Analysis of a New Technique", pp. 1-6, Oct. 2005, Department of Anesthesiology and Intensive Care, Division of Cardiothoracic and Vascular Anesthesiology and Intensive Care, Amrita Institute of Medical Sciences and Research Center.
TMP Lock Balloon Catheter Set, Package insert.
David H. Deaton, MD; ĿImage-Guided Thrombectomy in Vascular Surgery; article; Featured Innovation: The Over-the-Wire Fogarty Thru-Limen Embolectomy Catheter; Jul. 2005.
Takahiro Shoji, et al.; ĿResuscitative Endovascular Balloon Occlusion of the Aorta using a Low-Profile Device is Easy and Safe for Emergency Physicians in Cases of Life-Threatening HemorrhageĿ; The Journal of Emergency Medicine, vol. 54, No. 4, pp. 410-418; Dec. 2017.
Tsurukiri, Junya; et al.; "Resuscitative endovascular balloon occlusion of the aorta for uncontrolled haemorrahgic shock as an adjunct to haemostatic procedures in the acute care setting"; article; Scandinavian Journal of Trauma, Resuscitation and Emergency Medicine; 2016.
"Fogarty Thru-Lumen Embolectomy Catheter".
Edwards Fogarty Catheters brochure.
John Shulze; "Biosensors Embolectomy Catheter Premarket Notification"; 510K Summary; Aug. 11, 1997.
Anastacio C. Ng and Edward C. Ochsner; "Use of Fogarty Catheter Tamponade for Ruptured Abdominal Aortic Aneurysms"; Western Univeristy, Department of Radiology; May 24, 1976.
Matsumura, Yosuke; et al., "Distal pressure monitoring and titration with percent balloon volume: feasible management of partial resuscitative endovascular balloon occlusion of the aorta (P-REBOA)", European Journal of Trauma and Emergency Surgery (2021).
Onishi, Yasuyuki; et al., "Loop formation by an aortic occlusion balloon catheter during resuscitative endovascular balloon occlusion of the aorta (REBOA)", Radiology Case Reports 14 (2018), pp. 184-186.
Hill, B., Fogarty, T.J., "The use of the Fogarty catheter in 1998", The International Society for Cardiovascular Surgery, published by Elsevier Science Ltd., vol. 7, No. 3, pp. 273-278 (1999).
Jaeger, J. Michael and Durbin, Charles G. Jr., "Special Purpose Endotracheal Tubes", Respiratory Care, Jun. 1999, vol. 44 No 6.
Philipsen, Tine E.; et al., "The Use of Rapid Endovascular Balloon Occlusion in Unstable Patients with Ruptured Abdominal Aortic Aneurysm", Innovations, vol. 4, No. 2, Mar./Apr. 2009.
Stannard, Adam; et al., "Resuscitative Endovascular Balloon Occlusion of the Aorta (REBOA) as an Adjunct for Hemmorrhagic Shock", The Journal of Trauma Injury, Infection, and Critical Car, vol. 71, No. 6, Dec. 2011.
Rasmussen, Todd E.; et al., "Tourniquets, vascular shunts, and endovascular technologies: Esoteric or essential? A report from the 2011 AAST Military Liaison Panel", Trauma Acute Care Surg, vol. 73, No. 1, Jan. 10, 2012.
White, Joseph M.; et al., "Endovascular balloon occlusion of the aorta is superior to resuscitative thoracotomy with aortic clamping in a porcine model of hemorrhagic shock", Unifromed Services University of the Health Sciences, U.S. Department of Defense (2011).
Berland, Todd L.; et al., "Technique of supraceliac balloon control of the aorta during endovascular repair of ruptured abdominal aortic aneurysms", Journal for Vascular Surgery, vol. 57, No. 1 (2013).

(56) References Cited

OTHER PUBLICATIONS

Morrison, Johnson J.; et al., "Use of Resuscitative Endovascular Balloon Occlusion of the Aorta in a Highly Lethal Model of Noncompressible Torso Hemorrhage", Basic Science Aspects, Oct. 25, 2013.

Irahara, Takayuki; et al., "Retrospective study of the effectiveness of Intra-Aortic Balloon Occlusion (IABO) for traumatic haemorrhagic shock", World Journal of Emergency Surgery (2015).

Takahiro Shoji, et al.; "Resuscitative Endovascular Balloon Occlusion of the Aorta using a Low-Profile Device is Easy and Safe for Emergency Physicians in Cases of Life-Threatening Hemorrhage"; The Journal of Emergency Medicine, vol. 54, No. 4, pp. 1-9; Dec. 2017.

Osborn, Lesley A.; et al., "Resuscitative endovascular balloon occlusion of the aorta: current evidence", Dove Medical Press journal: Open Access Emergency Medicine, pp. 29-38 (2019).

Vrancken, Suzanne M.; et al., "A contemporary assessment of devices for Resuscitative Endovascular Balloon Occlusion of the Aorta (REBOA): resource-specific options per level of care", European Journal of Trauma and Emergency Surgery, Apr. 24, 2020.

Akihiko, Hitoshi Hashiguchi, "Two cases of ruptured abdominal aortic aneurysm successfully treated by central blockade with a small-bore rescue balloon", Journal of the Japan Blood Exchanged Society (2015).

Corcos, Thierry;et al., "Orion, An Improved Balloon on a Wire System: Initial Experience", Catheterization and Cardiovascular Diagnosis 20: 103-107 (1990).

"Resuscitative Endovascular Balloon, Occlusion of the Aorta: Block Balloon", REBOA Block Balloon, catalog.

Saab, Mark A., "Applications of High-Pressure Balloons in the Medical Device Industry", website, https://www.mddionline.com/cardiovascular/applications-of-high-pressure-balloons-in-the-medical-device-industry.

The Journal of Trauma and Acute Care Surgery, Wolters Kluwer, journal, vol. 75—Issue 1, Jul. 2013.

Scott, Daniel J.; et al., "A novel fluoroscopy-free, resuscitative endovascular aortic balloon occlusion system in a model of hemorrhagic shock", East 2013 Poster Paper, Trauma Acute Care Surg, vol. 75, No. 1 (2013).

Bleifeld, W.; et al., "Dynamics of Balloons in Intraaortic Counterpulsation", Department of Internal Medicine I, Helmholtz-Institute for Biomedical Engineering, vol. 116, No. 1.

Myler, Richard K.; et al., "The Balloon on a Wire Device: A New Ultra-Low Profile Coronary Angioplasty System/Concept", Catheterization and Cardiovascular Diagnosis 14: pp. 135-140 (1988).

Jun. 3, 2019 PCT Search Report (Serial No. PCT/US18/62228).

May 22, 2020 USPTO Office Action (U.S. Appl. No. 16/197,862).

PCT International Search Report and Written Opinion from PCT/CA2020/050976 mailed on Mar. 23, 2021.

* cited by examiner

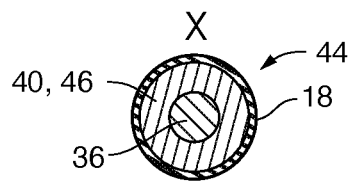
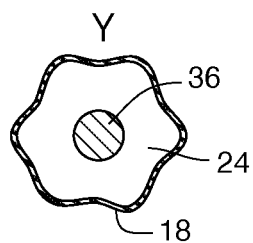
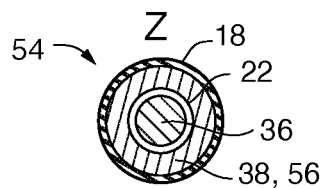
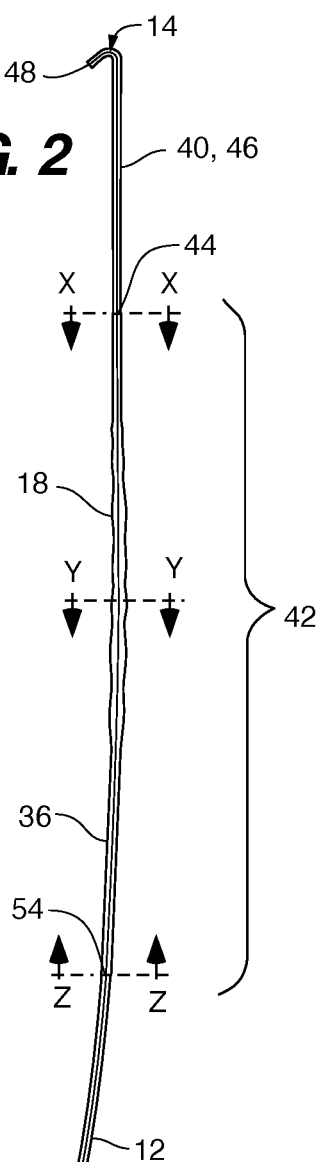
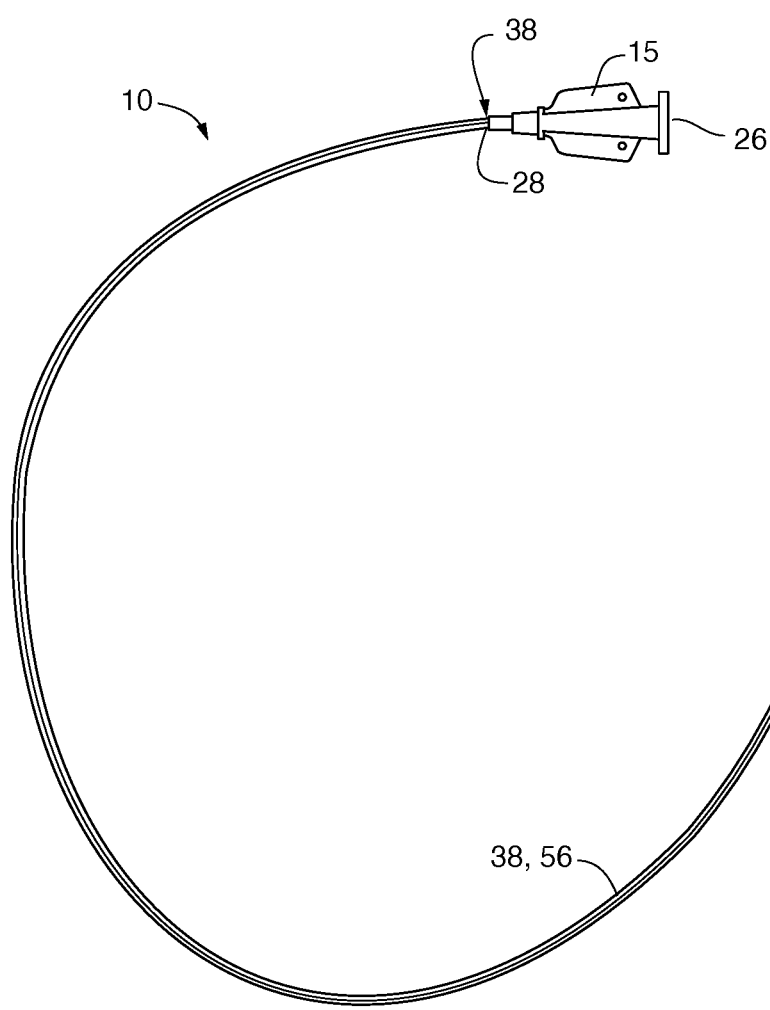

DEVICES AND METHOD FOR BLOOD VESSEL OCCLUSION

FIELD OF THE INVENTION

The present disclosure generally relates to the field of occlusion devices for the temporary occlusion of a blood vessel. More specifically, the disclosure relates to Resuscitative Endovascular Balloon Occlusion of the Aorta (REBOA) via a unique occlusion assembly and method of employing the same.

BACKGROUND OF THE INVENTION

Devices utilized in REBOA procedures are generally occlusion catheters that are inserted through the groin and advanced into the aorta, where the occlusion assembly, such as a balloon, is expanded in order to occlude the aorta thereby cutting off or reducing blood flow to organs downstream from the balloon and thereby increasing blood flow above or upstream of the balloon, specifically to the heart and the brain.

Preferably, catheters used in REBOA techniques should have as low a profile as possible so as to minimize complications during insertion, particularly those that are associated with the risk of bleeding when accessing arteries. Known REBOA devices have profiles which allow them to be inserted via relatively larger introducer sheaths of between 7 and 12 French. A lower profile would allow for easier insertion of the device since a smaller access hole in an artery will suffice. In turn, this may reduce or eliminate the need for large sheaths to guide entry. Furthermore, removal of a device having a lower profile may also reduce the risk of bleeding, since a smaller access hole also leads to reduced bleeding from the access site, which is particularly important in a battlefield or emergency setting.

A low profile device with the addition of an atraumatic tip eliminates the need to be tracked over an initially placed endovascular guide wire. This offers other advantages as well, including ease of use with minimal training, and may dispense with the need of using imaging, such as by fluoroscopic or X-ray guidance to make sure that the balloon is in place before inflation and occlusion of an artery. This is especially beneficial in emergency settings, when the expert users and imaging equipment may not be available.

There remains a need among REBOA devices for an occlusion assembly that has as reduced a profile as is possible, capable of atraumatic insertion, and does not require tracking over an initially placed endovascular wire, that may be utilized in a variety of conditions by personnel ranging from trained physicians in a hospital setting, to first responders in an emergency or battlefield setting. We have discovered that a REBOA device should be capable of smooth transitional inflation and deflation to ensure proper occlusion of the aorta during use, while providing various degrees of partial occlusion of the aorta to allow transient flow past the balloon to the ischemic tissues. We have also discovered that the ability to overinflate the balloon with a reduced risk of balloon or blood vessel rupture is desirable in some instances as it permits safe usage and facilitates placement in emergency settings.

The occlusion assembly disclosed herein, meets all of the needs mentioned above in a single device.

SUMMARY OF THE INVENTION

In contrast to conventional REBOA occlusion devices, the present device may be inserted into a patient via an introducer sheath having a lower profile as small as 4 French.

The device includes an atraumatic J-tip with a built in, peel-off, J-tip straightener that allows the atraumatic tip to be easily inserted into an introducer sheath.

The main components of the device are a single elastomeric molded balloon that envelopes a portion of the elongate shaft and its central wire. Proximal of the balloon envelope, the elongate shaft defines a longitudinal passage that does double duty as an inflation lumen and wire positioning lumen. Distal of the balloon envelope the elongate shaft is adhered to the wire. The balloon envelope shape is modified by stretching and bonding each end of the balloon envelope over a mounting region of the elongate shaft, which is itself constructed of two types of extruded polyether block amide (PEBA) materials. The elongate shaft has an inflation outlet port within the interior of the balloon envelope that is in fluid communication with the central passage. The central passage extends proximally along the length of the shaft to an inflation inlet port, into which inflation fluid for expanding the balloon envelope may be injected, via a syringe or other mechanism.

The balloon envelope has a pre-molded size and shape. This, along with its elastomeric construction and the manner of it being bonded to the mounting region of the elongate shaft, provides the balloon envelope with several operation modes, or states, of operation other than being limited to an unexpanded state and a fully expanded state.

In contrast to conventional spherical or rounded occlusion balloons, the balloon envelope of the type disclosed herein, has a generally "reverse tear drop" or "ice cream cone" shape. The essential sameness of the shap of the balloon envelope independent of the inflation volume over a range of operational states is referred to herein as a "self-similar shape". This general shape is largely maintained over the entire range of inflation states. The reproducibility of the shape at several inflation volumes allows the balloon envelope to form a variable valve with the descending aorta in operation. This attribute, in combination with the narrow profile of the inflation lumen, allows the device to address two important medical concerns. The first is the reduction of shock due to a too rapid restoration of flow when the device moves from a fully inflated state to the minimal, or uninflated, state. Reduction in shock makes the device much safer in use than prior devices. Secondly, the ability to operate at intermediate inflation values allows for physician control of limited and controlled perfusion distal to the balloon to support organs, thus extending the time that the device may be used to treat patients. This is a benefit in both emergency and clinical settings, and greatly improves the utility of the device in contrast to conventional devices offering only "on" and "off" flow states.

The balloon envelope of the present device may also be safely over inflated over its normal "fully inflated" state. This provides further utility over conventional REBOA devices. Over inflation of the balloon envelope with conventional REBOA devices can predispose the balloon envelope to damage and/or the aorta to rupture. The ability to overinflate the balloon envelope in the aorta is an important safety feature of the present device allowing a larger window of inflation volumes to the user to reduce the overall risk of inflation. When over inflated in an upside down Y-shaped vessel bifurcation, for example the aorto-iliac bifurcation, the balloon will essentially pull itself gently into the larger vessel. This reduces the risk of the balloon envelope rupturing the narrower iliac artery and instead the balloon envelope is gently pulled up into the wider aorta greatly facilitating ease of use and safety.

These and other attributes and embodiments of the present occlusion device are shown in the accompanying drawings and described in greater detail below.

BRIEF DESCRIPTION OF THE DRAWINGS

FIG. 2 is a side view of the embodiment of the occlusion device, shown before use.

FIG. 3 is a cross-sectional view of the embodiment shown in FIG. 2 taken at line X.

FIG. 4 is a cross-sectional view of the embodiment shown in FIG. 2 taken at line Y.

FIG. 5 is a cross-sectional view of the embodiment shown in FIG. 2 taken at line Z.

DETAILED DESCRIPTION

Figure 1:
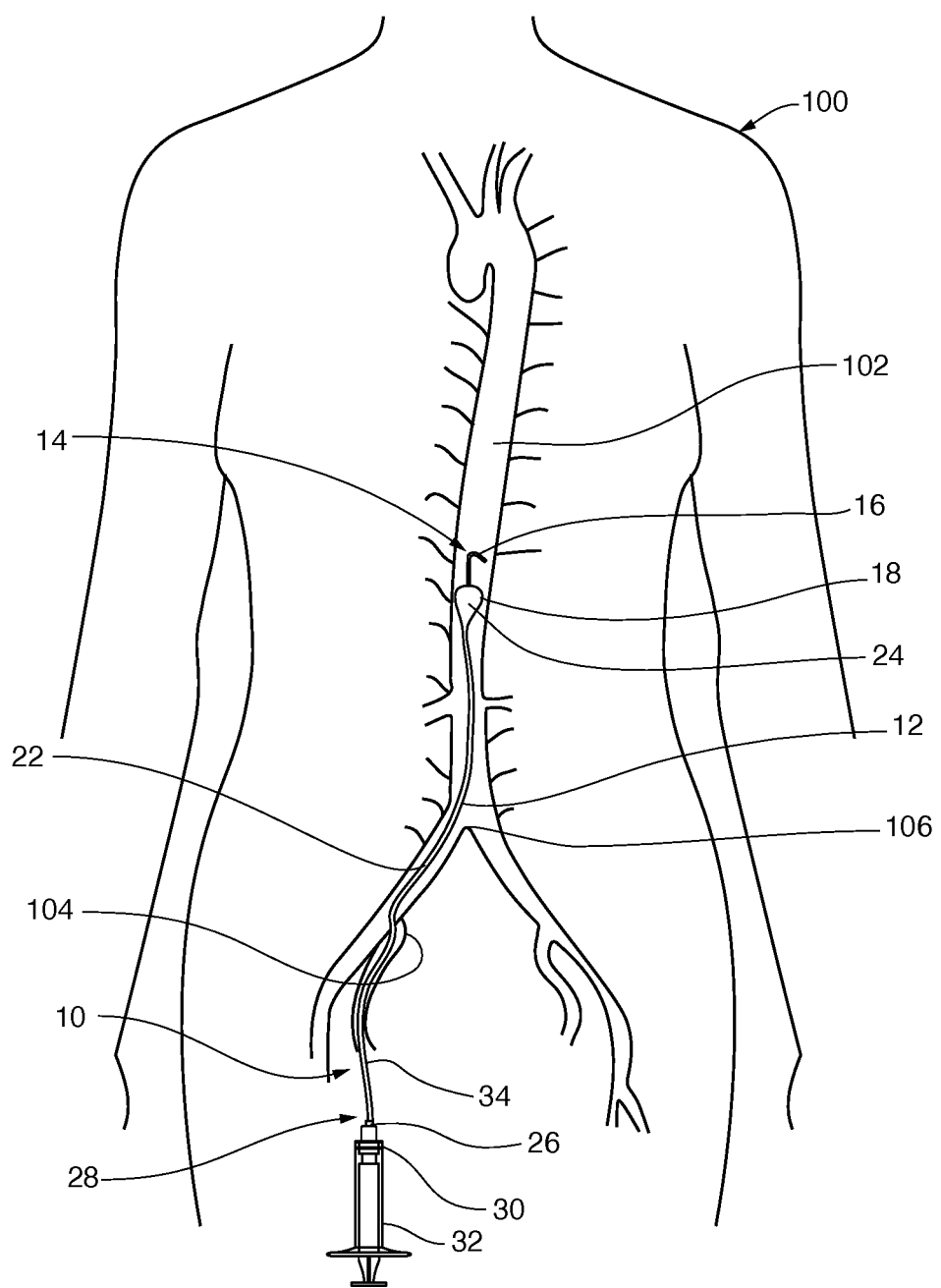
FIG. 1 is an illustration of a region of human anatomy wherein an embodiment of the occlusion assembly is shown in use in a REBOA procedure.
Figure 6:
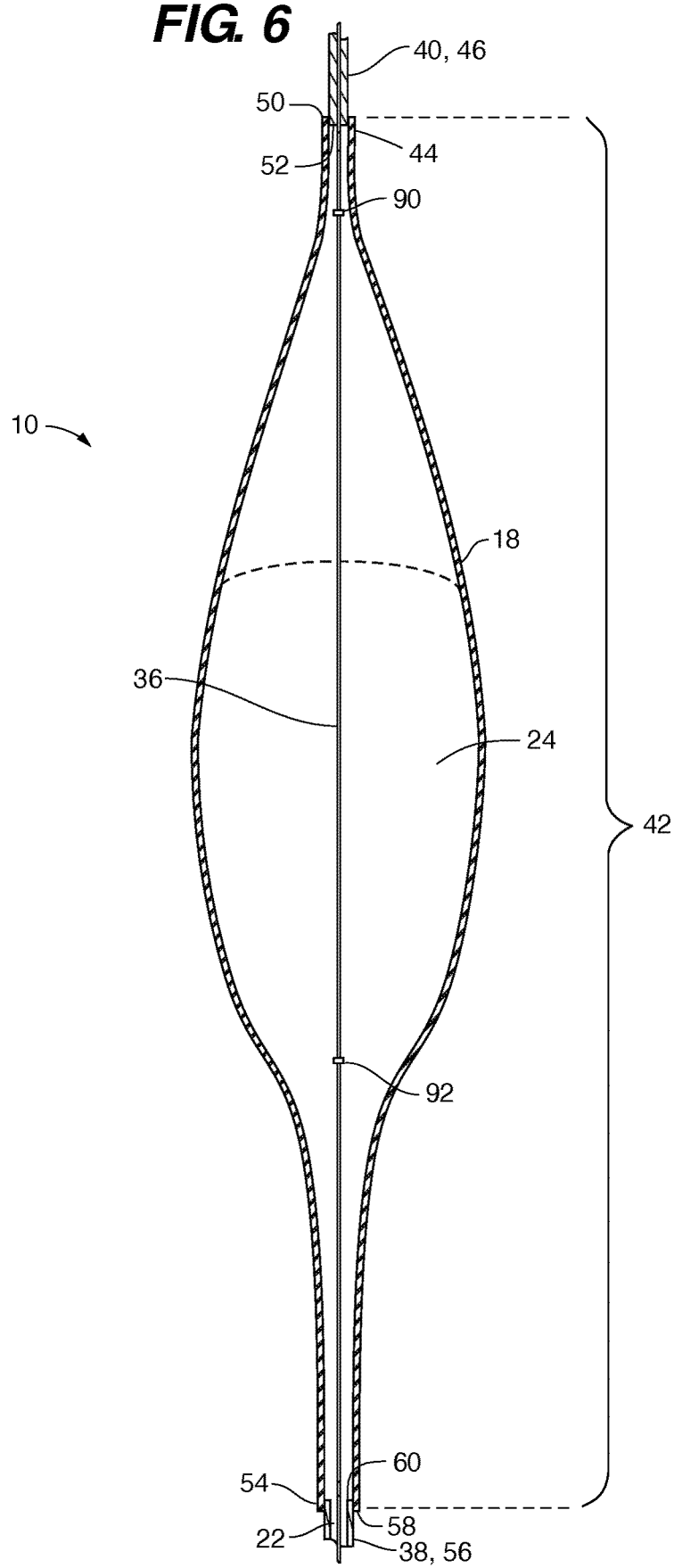
FIG. 6 is a close-up view of the balloon envelope and the adjacent balloon mounting region of the occlusion assembly shown in FIG. 2, depicted in longitudinal sectional view.

As indicated above, embodiments of the present invention are directed to an occlusion assembly 10 for use in REBOA procedures. An example of an embodiment of the occlusion assembly 10 as it may be used in a REBOA procedure is illustrated in FIG. 1. As is shown, the assembly 10 includes an elongate shaft 12, which terminates at a distal shaft end 14 in an atraumatic J-tip 16. Proximal to the J-tip 16 is positioned a balloon envelope 18. The shaft 12 defines a central passage or lumen 22, which is in fluid communication with the interior 24 of the balloon envelope 18 and sealed at the distal end of the balloon. The lumen 22 extends from the balloon envelope 18 to an inflation port 26 located at the proximal shaft end 28. Through the inflation port 26, inflation fluid 30 may be injected into the lumen 22, and thus, the balloon envelope 18, via a syringe 32 or equivalent mechanism; thereby causing the balloon envelope 18 to expand and occlude the aorta 102.

During the REBOA procedure, the occlusion device 10 is advanced to a target site within the aorta 102 of a human patient 100. Though the occlusion assembly 10 may be inserted into the aorta 100 using a variety of different arterial pathways, in the embodiment shown, the occlusion assembly 10 is inserted initially into the femoral artery 104 via a 4 Fr introducer sheath (not shown), and then advanced into the aorta 102 beyond the aortic bifurcation 106. Once the balloon envelope 18 is at the target position within the aorta or other branch vessel, the balloon envelope 18 is expanded in the manner described above.

In at least one embodiment, proper positioning of the balloon envelope 18 may be visually estimated by way of one or more visual markers placed on the external surface of the elongate shaft 12. Such a marker 34, corresponds to the length of the elongate shaft 12, or the distance that the elongate shaft must be advanced into the aorta 102, in order to place the balloon envelope 18 in a desired anatomical area or zone. For example, in at least one embodiment, the assembly has a visual marker 34 corresponding to a length/distance of at least 40 cm from the balloon envelope 18 to the mark 34, which corresponds to a placement of the balloon envelope above the junction of the lowest renal artery in most adult patients.

Embodiments of the assembly 10 may have any number of visual markers to indicate proper deployment distances for specific anatomical positioning. In at least one embodiment, the elongate shaft has two visual markers 34, with one corresponding to a length/distance of 48 cm from the center of the balloon envelope 18 and the other corresponding to a length of 28 cm from the center of the balloon envelope 18. These marker designations correspond to Zone 1 of the thoracic aorta and Zone 3 of the infrarenal aorta.

In at least one embodiment, the visual marker(s) 34 may be customized to the assembly 10 based on pre-use examination of the patient.

Turning to FIG. 2, an embodiment of an occlusion assembly 10 is shown prior to use. In this view, the presence of a support wire 36 is shown. The support wire or wire 36, is a stainless steel, or equivalent material, wire having a diameter of 0.03 inch (0.76 mm), or less, that extends the entire length of the elongate shaft 12 between the proximal shaft end 28 and the distal shaft end 14. In at least one embodiment, the wire has a diameter of 0.028 inch (0.71 mm). The length of the shaft 12 and the wire 36 is measured from the proximal shaft end 28 to the distal shaft end 14.

At the proximal shaft end 28, a hub 15 is engaged to the elongate shaft 12. The wire 36 is held in place relative to the other components of the elongate shaft 12 (said components are identified and discussed in more detail below) as well as the balloon envelope 18, by way of its proximal end 29 being embedded or other secured to the hub 15. The hub 15 also defines the inflation port 26, referenced in FIG. 1, which is in fluid communication with the inflation lumen 22 of the elongate shaft 12, and to which a syringe 32 or other inflation device may interface with the inflation lumen 22.

At the opposite end of the assembly 10, the wire 36 terminates at the atraumatic J-tip 16. The J-tip 16 is a 5 cm coil or J-curve of approximately 180 to 360 degrees imparted to the wire 36 to ensure that the distal shaft end 14 does not catch or otherwise harm the vessels through which the occlusion assembly 10 is advanced.

In at least one embodiment, the length of the elongate shaft 12 is no greater than 75 cm. In at least one embodiment the length of the elongate shaft is no greater than 65 cm. If the access site is at another area, such as the radial artery in the wrist, then the length of the elongate shaft is no greater than 85 cm. In another embodiment for pediatric patients, the elongate shaft is no longer than 45 cm.

In FIG. 2, three cross-sectional reference lines X, Y and Z are labeled at different points along the length of the elongate shaft 12. These cross-sections are depicted in FIGS. 3, 4 and 5 respectively, and illustrate the manner in which the balloon envelope 18 is bonded or welded to the materials of the elongate shaft 12.

Note that in the embodiment illustrated in in FIGS. 3-6, the bonding or welding of the balloon envelope 18 to the elongate shaft 12 is, for purposes of illustration and description, presented to show the relevant structures in overlapping engagement, it will be understood by those of ordinary skill in the art that the relevant structures may alternatively be bonded or welded together end to end (i.e. butt welded or joined).

The reference lines X, Y and Z are also useful for dividing up the elongate shaft into three component regions that make up the elongate shaft 12. Extending distally from the proximal shaft end 28 to cross-sectional reference Z, the elongate shaft 12 comprises a proximal shaft region 38. Extending distally from cross-sectional reference X to the distal shaft end 14, the elongate shaft 12 comprises a distal shaft region 40. Extending between the proximal shaft region 38 and the distal shaft region 40 (i.e. between cross-sectional reference Z and cross-sectional reference X), the elongate shaft 12 comprises a balloon mounting region 42, directly visible in FIG. 6, but obscured here by the presence of the balloon envelope 18, which is mounted over the balloon mounting region 42.

Turning now to the cross-sectional views depicted in FIGS. 3, 4, and 5, in FIG. 3, a section of the elongate shaft 12 is shown which corresponds to a distal bonding region 44. The distal bonding region 44 marks the distal end of the balloon mounting region 42 and the beginning of the distally extending distal shaft region 40. The distal shaft region 40 comprises a layer 46 of polyether block amide (PEBA) that is extruded on to a distal portion of the wire 36 extending from the distal bonding region 44 to the terminal end 48 of the atraumatic J-tip 16. A distal end 50 of the balloon envelope 18 is bonded or welded to the proximal end 52 of the PEBA layer 46 of the distal shaft region 40. PEBA layer 46 adheres to the wire 36 thus sealing both the distal shaft region 40 and the distal end 50 of the balloon envelope 18 to the wire 36.

In at least one embodiment, the PEBA layer 46 of the distal shaft region 40 is a lubricious form of PEBA sold under the trademarked name VESTAMIDE® EVER-GLIDE® MED by the Polymer Dynamix company.

In at least one embodiment the distal shaft region 40 and the corresponding layer 46 have a length of no greater than 8 cm as measured from the distal bonding region 44 to the terminal end 48 of the atraumatic J-tip 16.

Skipping FIG. 4 for the moment, and looking now to FIG. 5, depicted in FIG. 5 a section of the elongate shaft 12 is shown, which corresponds to the position of a proximal bonding region 54.

The proximal bonding region 54 marks the proximal end of the balloon mounting region 42 and the beginning of the proximally extending proximal shaft region 38. The proximal shaft region 38 comprises a tube 56 of polyether block amide (PEBA) that is disposed about that portion of the wire 36 extending from the proximal bonding region 54 to the proximal shaft end 28. The tube 56 defines the inflation lumen 22, which does double duty as a passage through which the wire 36 extends. A proximal end 58 of the balloon envelope 18 is bonded or welded to the distal end 60 of the tube 56 at the proximal bonding region 54. The distal end 60 of the tube 56 corresponds with the end of the inflation lumen 22, which is in fluid communication with the interior 24 of the balloon envelope 18.

In at least one embodiment the tube 56 is manufactured from a form of PEBA sold under the trademark PEBAX® and manufactured by the Compounding Solutions company.

Returning now to FIG. 4, the cross-section depicted in FIG. 4 is a section of the assembly 10 corresponding approximately to the mid-point of the working portion of the balloon envelope 18. As is shown, the balloon envelope 18 is disposed about the wire 36, with the bare wire 36 passing through the interior 24 of the balloon envelope 18, between the proximal bonding region 54 and the distal bonding region 44.

In at least one embodiment, the balloon envelope is formed from an elastomeric polymer such as Urethane.

Figure 7:
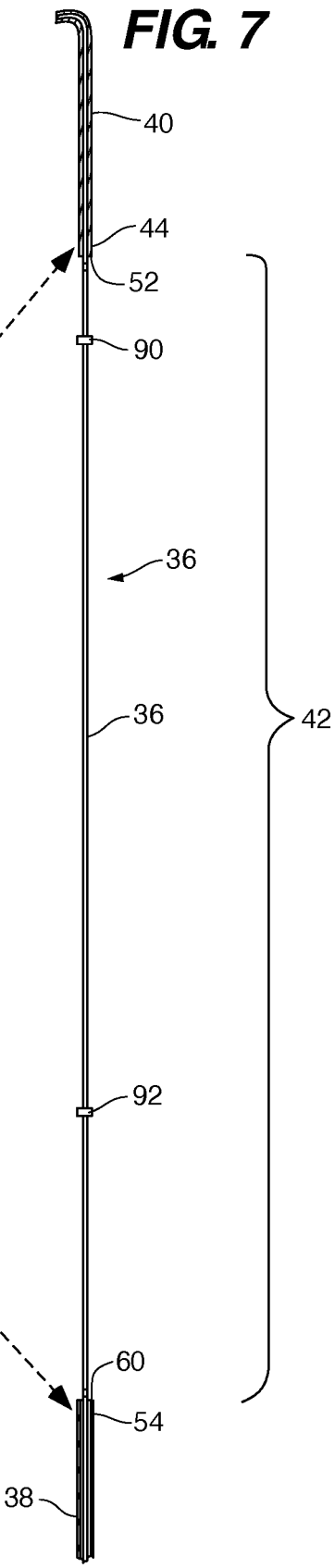
FIG. 7 is a side view of a distal end portion of an embodiment of the occlusion device shown prior to the bonding of the pre-molded balloon envelope to the elongate shaft.

Turning to FIG. 7 the elongate shaft 12 is shown adjacent to the balloon envelope 18 prior to the balloon envelope being mounted onto the elongate shaft 12. The balloon envelope 18 as shown in its as molded state. The balloon envelope 18 is a contiguous envelope of elastomeric material which is molded into form whose working portion has a shape akin to an ice cream cone or reverse tear drop. This shape has several identifiable portions that are useful in describing the balloon and its performance characteristics. Starting from the proximal end 58, the balloon envelope 18 includes a proximal neck 62, which transitions into a conical proximal shoulder section 64; this shoulder section transitions into a conical proximal taper section 66. From the distal end 50 the balloon envelope 18 includes a distal neck 68, which transitions into a distal shoulder section 70; this shoulder section transitions into a truncated conical distal blunt section 72.

As is shown, conical proximal taper section 66 and truncated conical distal blunt section 72 intersect at a meridian 74, which marks the area of the balloon envelope 18 having the largest as molded diameter. In the as molded state, the conical proximal taper section 66 has a greater longitudinal length than that of the truncated conical distal blunt section 72.

In at least one embodiment, the balloon envelope 18, in the molded state has a total length of approximately 70 mm as measured from the proximal end 58 to the distal end 50, and an outer diameter of approximately 8 mm at the meridian 74. The proximal neck 62 has a length of approximately 10 cm and the distal neck 68 has an approximate length of 2 cm and both have a contiguous outer diameter of approximately 1.35 mm.

As is shown in FIG. 7, the balloon mounting region 42 has a length greater than the length of the balloon envelope itself. Thus, the balloon envelope 18 must be longitudinally stretched in order to be mounted onto the elongate shaft 12.

In at least one embodiment, the balloon mounting region is at least 2.5 cm longer than the balloon envelope 18.

The dimensions and shape of the balloon envelope 18, in combination with the unique construction of the elongate shaft 12, not only allows for the occlusion assembly to be inserted into the patient using an introducer sheath as small as 4 Fr, but also allows the balloon envelope 18 to have multiple useful inflation states and unique inflation characteristics.

Figure 8:
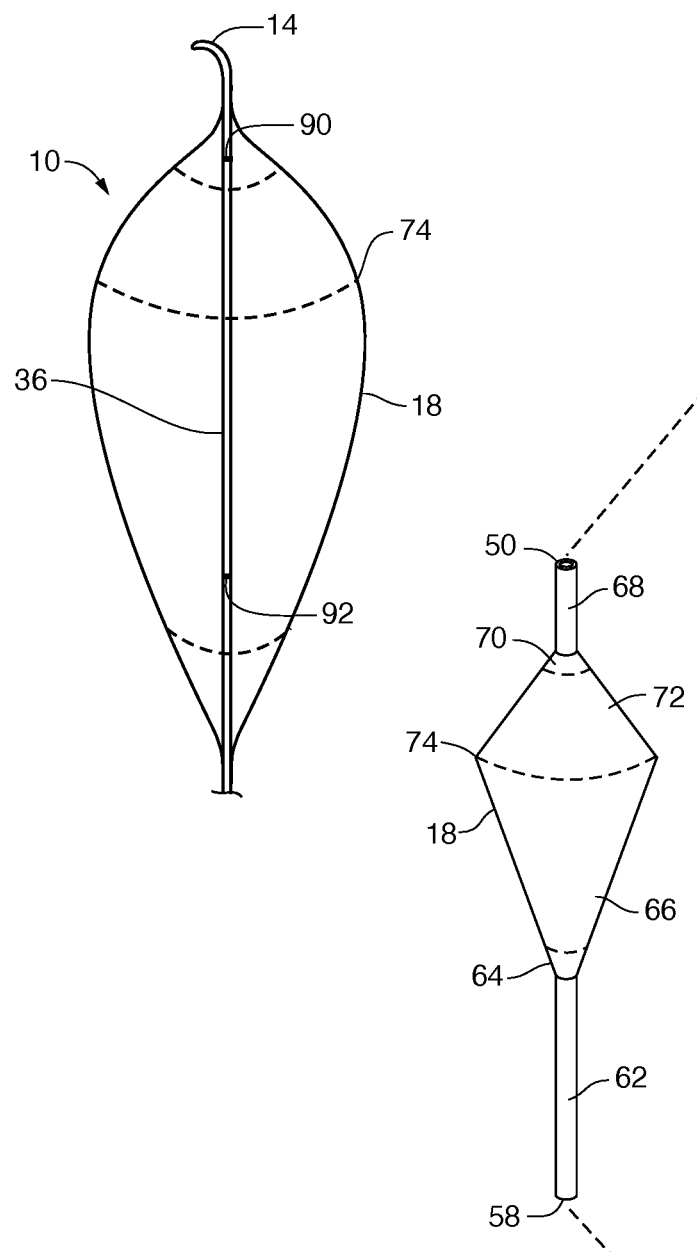
FIG. 8 is a longitudinal, sectional view, of the distal end portion of the occlusion device shown in FIG. 7 but in an assembled state and the balloon envelope inflated to its normal or fully inflated state in an unconfined environment.
Figure 9:
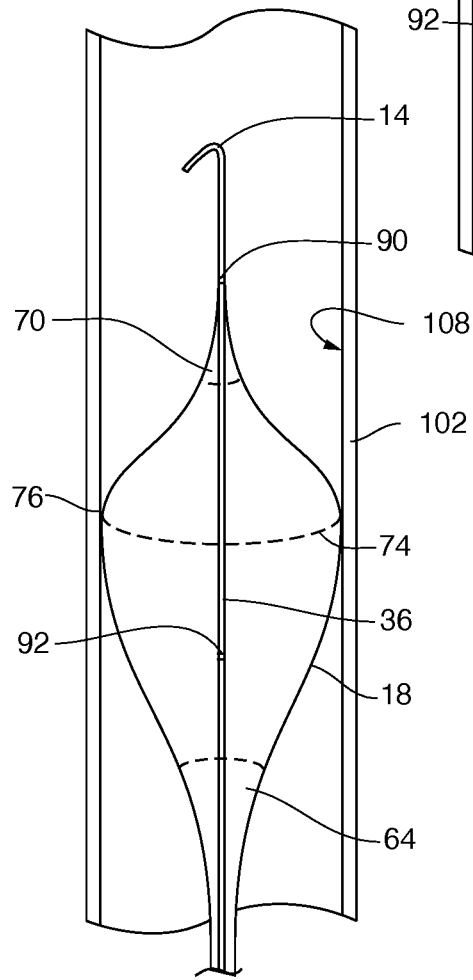
FIG. 9 is a longitudinal, sectional view, of the distal end portion of the embodiment shown in FIG. 8, with the balloon envelope in the fully inflated state and occluding the aorta of a patient.

For purposes of standard REBOA use, the balloon envelope 18 has a fully inflated state, such that when the balloon envelope 18 is fully expanded, the meridian 74 will correspond with that region of the envelope 18 having the greatest diameter, such as in the manner illustrated in FIGS. 8 and 9. This relationship of the meridian's position as the widest section of the balloon envelope 18 is constant whether the envelope 18 is expanded to its fully inflated state within the confines of the aorta 102 and subject to blood pressure acting against it, such as in the depiction of FIG. 9; as well as when the balloon envelope 18 is expanded to its fully inflated state outside of the body, such as in the depiction of FIG. 8.

In at least one embodiment, the fully inflated state of the balloon envelope is achieved by injection of between 10-15 ccs of inflation fluid (e.g. saline) into the interior of the balloon envelope in the manner previously described. When fully expanded the meridian 74 has an outer diameter of approximately 25-30 mm. When positioned within the aorta 102, and inflated to the fully inflated state, such as in the manner shown in FIG. 9, the external surface 76 of the balloon envelope 18 should be in contact with the vessel wall 108 and providing complete occlusion to blood flow.

Figure 10:
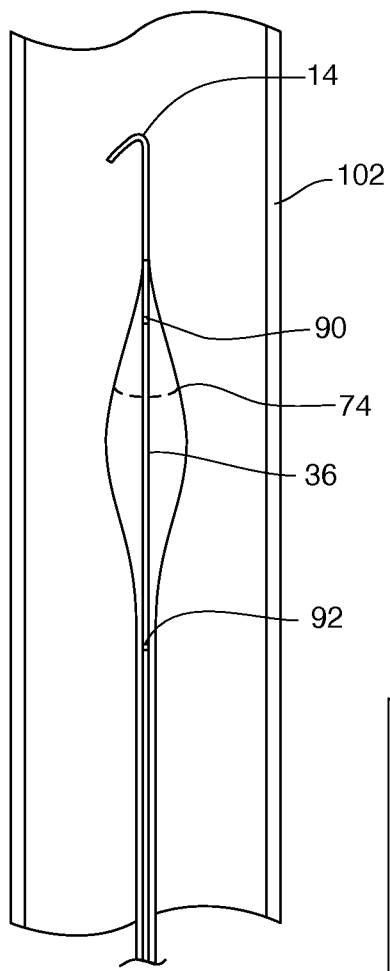
FIG. 10 is a longitudinal, sectional view, of the distal end portion of the embodiment shown in FIG. 9, shown during initial inflation of the balloon envelope.
Figure 11:
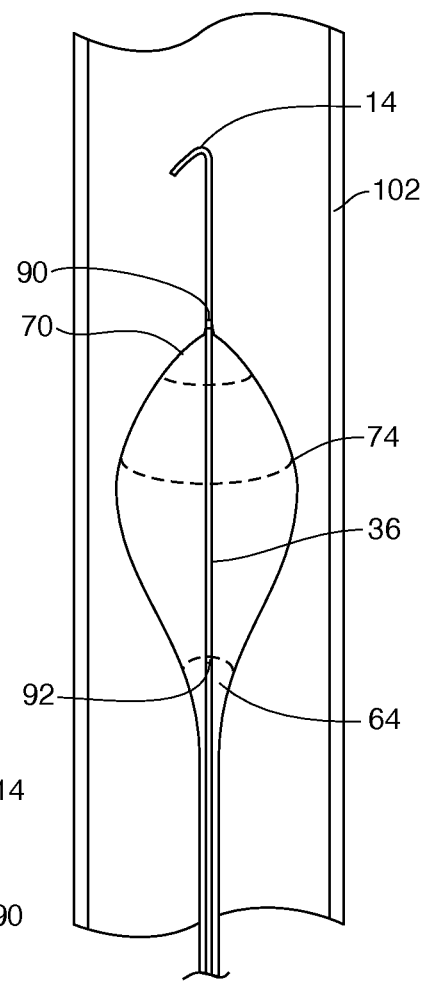
FIG. 11 is a longitudinal, sectional view, of the distal end portion of the embodiment shown in FIG. 10, with the balloon envelope depicted in a partially inflated state.

As implied above, the position of the meridian 74 is not constant in the various inflation states. For example during initial inflation, i.e. a low inflation state such as is shown in FIG. 10, or a partial inflation state such as is shown in FIG. 11, the meridian 74 has a first diameter and is located at a first distance from the distal shaft end 14. But as the balloon envelope 18 reaches the fully inflated state shown in FIG. 9, the meridian 74 has a larger diameter than in the other states and has transitioned further away from the distal shaft end 14.

Other aspects of the balloon envelope 18 will vary during expansion as well. For example, as the balloon envelope 18 is expanded from the partial inflation state of FIG. 11 to the fully inflated state of FIG. 9, the volume of the conical distal shoulder section 70 decreases such that in the fully expanded state the conical distal shoulder section volume is less than the conical distal shoulder section volume in the partially inflated state. Whereas the opposite occurs in the conical proximal shoulder section 64. In that section of the balloon envelope 18, the volume increases as the balloon envelope is expanded, such that in the fully inflated state the conical proximal shoulder section volume is greater than the conical proximal shoulder section volume in the partially inflated state.

During inflation, as the balloon envelope 18 is acted upon more and more by the blood pressure, the balloon envelope 18 migrates downwards along the wire 36 (in the direction of the proximal shaft end) and then eventually catches the aortic wall 108 for full occlusion. When the balloon envelope 18 is deflated, and blood is allowed to pass around the external surface of the balloon 76, the balloon envelope 18 will begin to go back to its unmigrated position.

With the offset nature of the balloon envelope 18 and also because of the stretch imparted to the balloon envelope 18 when it is mounted onto the balloon mounting region 42 (2.5 cm in at least one embodiment as discussed above), the general shape of the balloon envelope 18 is maintained during the inflation and deflation processes, which allows the fine adjustments (titratability) of blood flow. This is in contrast to known spherical balloons that are fixed to a catheter shaft and imparted with no stretch. Such balloons are unable to migrate and therefore the shape of the balloon changes substantially when acted on by blood pressure. Such balloons act much like an on/off switch in terms of performance (i.e. no appreciable occlusive effect before full occlusion at full inflation) and do not provide for the ability to be adjusted in the manner of the present balloon envelope 18 nor have the ability to gradually recirculate blood flow in a graduated manner during deflation such as the present device 10 provides.

Figure 17:
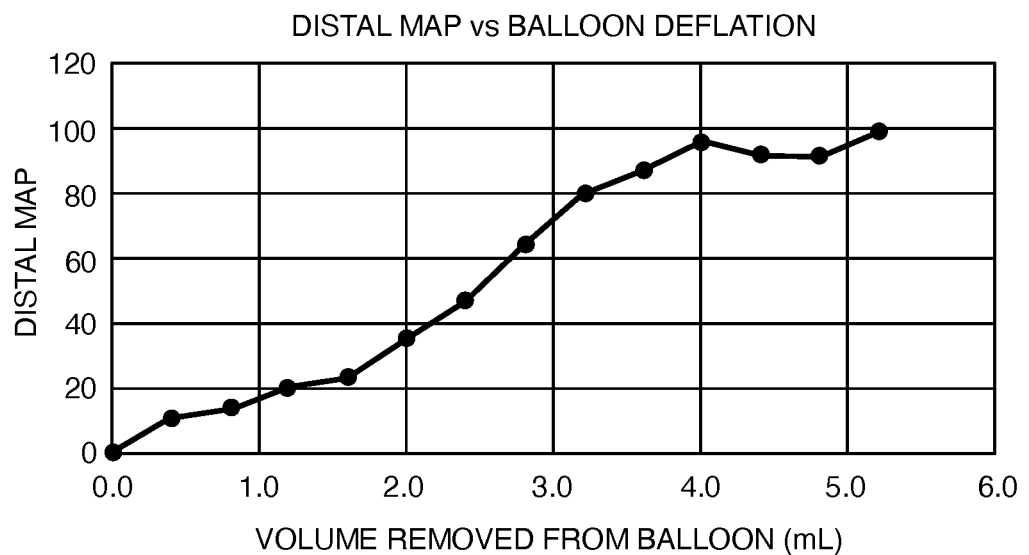
FIG. 17 is a graph produced from experimental observation and measurements.
Figure 18:
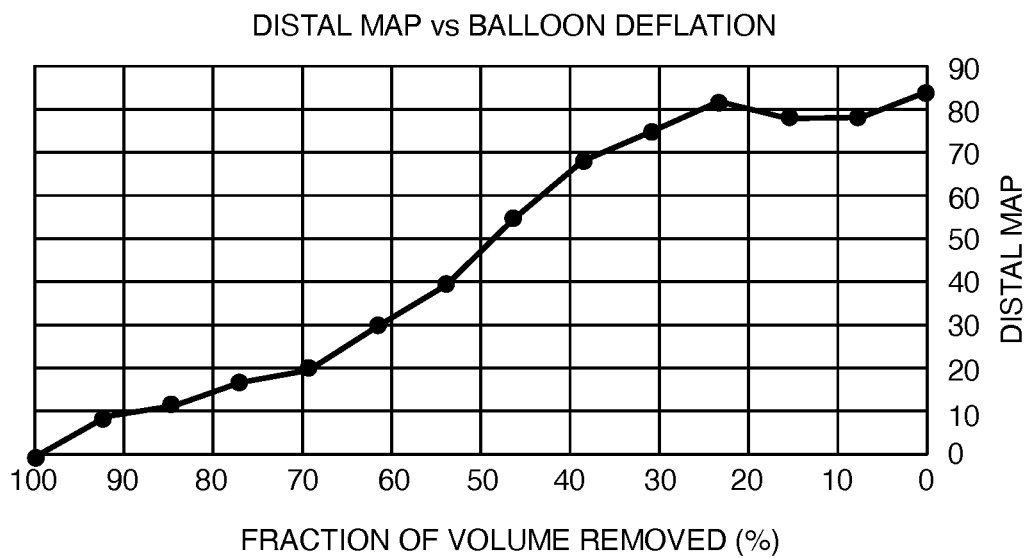
FIG. 18 is a graph produced from experimental observation and measurements.

The ability of the balloon envelope 18, and the device 10, to provide gradual and incremental occlusive effects is illustrated in FIGS. 17 and 18.

FIG. 17 and FIG. 18 should be considered together. They are plots of data taken in vivo from a porcine model used in development of the device 10. As mentioned above, in the prior art the occlusion balloon is either in the fully occluded state or effectively in the fully contracted state permitting full flow past the device. In contrast to this, the present device 10 provides for proportionate flow permitted past the balloon envelope 18 prior to and following full occlusion.

This is demonstrated by occluding the aorta and measuring the Mean Arterial Pressure (MAP) distal of the balloon. The measured MAP is seen on the Y-Axis in both FIG. 17 and FIG. 18. Referring to FIG. 17 note that the relationship between measured pressure and balloon envelope volume is nearly linear over the range of slightly less than 1 ml taken from the balloon envelope to the point where 4 ml are removed. Procedurally this corresponds to reducing volume in the balloon envelope from total occlusion to near total deflation. The linearity demonstrates that the pressure driving flow in the organ increases in a gradual fashion as balloon envelope volume is slowly reduced.

In FIG. 18 the same information is expressed as a function of percent balloon envelope volume reduction. Qualitatively this shows that inflation volume controls MAP over the full range of values from total occlusion to maximal flow. The self-similar shape attribute of the balloon envelope is maintained over a substantially linear range of inflation volume. This graphed data demonstrates that the amount of blood flow past the balloon envelope will be proportional to inflation volume over the operational range defined by the range of the self-similar shape of the balloon.

Figure 12:
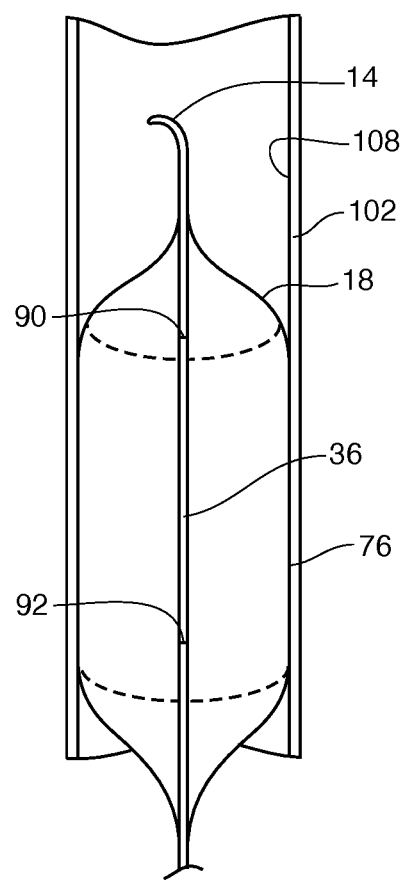
FIG. 12 is a longitudinal, sectional view, of the distal end portion of the embodiment shown in FIG. 11 with the balloon envelope in an over inflated.
Figure 13:
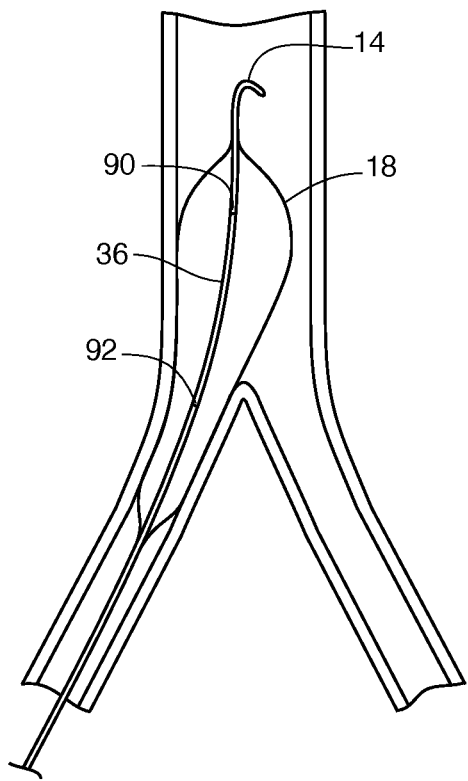
FIG. 13 is a is a longitudinal, sectional view, of the distal end portion of the embodiment shown in FIG. 12 wherein the balloon in the over inflated state is drawn distally into a side vessel of a bifurcation.

A unique feature of the present assembly 10, is the capacity to safely inflate the balloon envelope 18 into an over inflated state such as is shown in FIGS. 12 and 13. When over inflating the balloon 18 within the aorta 102 beyond the fully inflated state, the meridian 74 does not further increase in diameter from that in the fully inflated state, but rather will increase in longitudinal length, effectively transitioning the meridian from a narrow band of intersection with the aortic wall 108, to potentially the majority of the balloon envelope's external surface 76 being in contact with the wall 108. This is accomplished as a result of the shoulder sections 64 and 70 growing, rather than as a result of further stretching by the conical proximal taper section 66 and truncated conical distal blunt section 72.

This longitudinal widening of the meridian 74 is accompanied by a longitudinal advancement/growth of the balloon envelope 18 such that in the over inflated state the meridian 74 is closer to the distal shaft end 14 than in the fully inflated state, the partially inflated state, or the low inflation state.

There is an additional benefit of preventing vessel damage at a bifurcation with the ability to advance the balloon envelope 18 distally via the "growth" of the shoulder sections 64 and 70. For example, as shown in FIG. 13, when the balloon envelope 18 is over inflated in a upside-down Y-shaped vessel bifurcation (aorto-iliac bifurcation), the balloon will pull itself gently into the larger vessel (aorta) and prevent damage to the smaller vessel (iliac artery). The ice-cream cone shape of the balloon envelope 18 also promotes this growth into the larger vessel by preferentially inflating the wider ice-cream cone section of the truncated conical distal blunt section 72 of the balloon envelope 18, as long as this portion of the balloon is above the bifurcation.

In some embodiments, the balloon envelope 18 may be over inflated up to 700% by volume over the fully inflated state. A key characteristic of the present assembly 10, is that regardless of the degree of over inflation when properly used in the manner described herein, the balloon envelope will fail before damaging the aorta.

Figure 14:
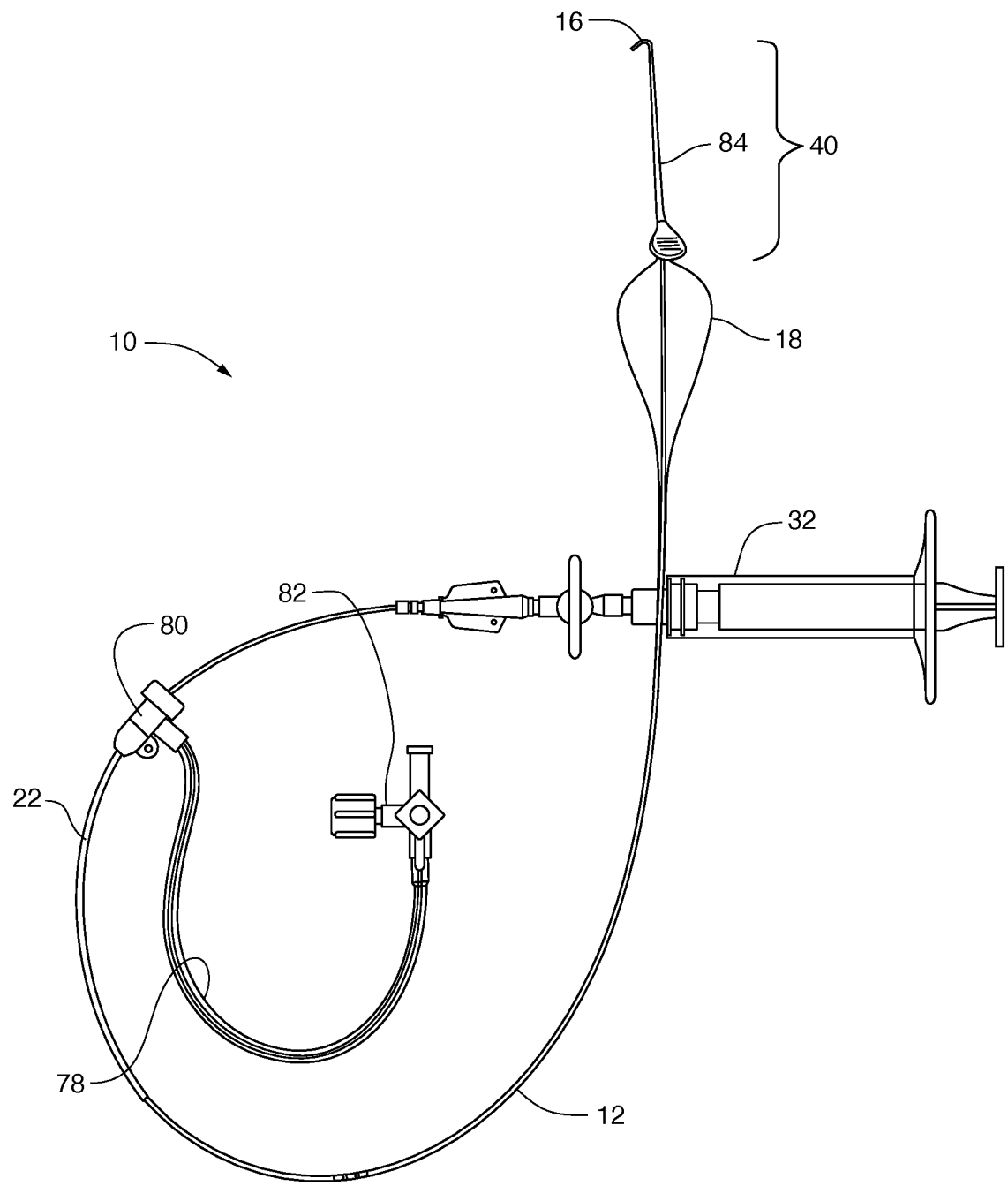
FIG. 14 is a side view of the embodiment shown in FIG. 2 shown in a fully assembled state and equipped with a side-arm shaft assembly, tip straightener and inflation syringe.

In addition to the characteristics discussed thus far, embodiments of the occlusion assembly 10 disclosed herein are provided with several other features that benefit both safety and ease of use during a REBOA procedure, an example of such an embodiment is shown in FIG. 14.

In the embodiment shown, the assembly 10, is provided with a side-arm shaft assembly 78 which is in fluid communication with the inflation lumen 22 of the elongate shaft 12 via a t-valve 80. The side-arm shaft assembly 78 includes a stop cock valve 82 that may be open and shut to allow inflation fluid to egress from the lumen 22 and provides the user with greater control of the inflation and deflation of the balloon envelope that a syringe 32 may allow by itself. The side-arm assembly may also act as an interface for a blood pressure monitor.

In the present embodiment, the assembly 10 is also provided with a J-tip straightener 84 that is preloaded over a portion of distal shaft region 40, between the distal end 50 of the balloon envelope 18 and the atraumatic J-tip 16.

Figure 15:
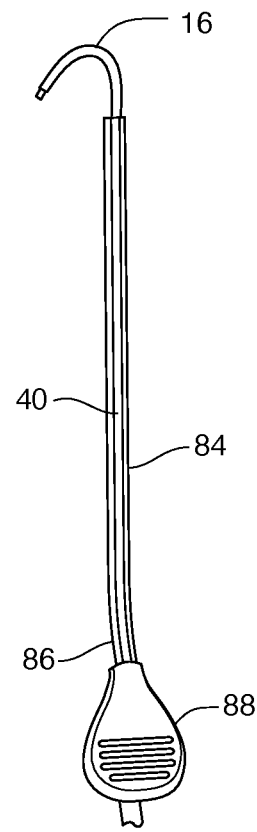
FIG. 15 is a close-up perspective view of the distal end of the embodiment shown in FIG. 14.
Figure 16:
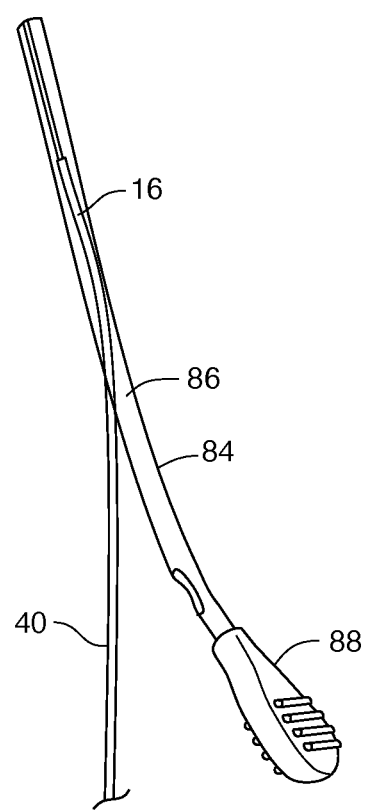
FIG. 16 shows the embodiment depicted in FIG. 15, with the J-tip straightener partially peeled off to illustrate the manner in which the atraumatic tip is straightened for ease of insertion into an introducer sheath (not shown).

The J-tip straightener 84 has a unique construction and role as illustrated in more detailed views of FIGS. 15 and 16. The J-tip straightener is essentially a hollow peel-off shaft or tube 86 that is disposed about a portion of distal shaft region 40. When the assembly 10 is ready for use, the user slides the J-tip straightener 84 onto and over the coil of the atraumatic J-tip 16, which will temporarily straighten as a consequence of the confinement and advancement of the J-tip straightener 84 over the tip 16. This temporary straightening of the atraumatic J-tip 16 allows it to be more easily threaded into the 4 Fr introducer (not shown) during initial insertion of the assembly during a REBOA procedure.

For further ease of operation the J-tip straightener 84 includes a user engagement tab or grip 88 that protrudes from the peel-off shaft 86, and which user may grasp and pull distally to more easily advance of the J-tip straightener 84 over the J-tip 16.

Finally, in at least some embodiments, the elongate shaft 12 is provided with at least two radiopaque (RO) markers 90 and 92, such as are shown in FIGS. 6-13. As illustrated, the RO markers 90 and 92 are placed on the wire 36 at locations within the balloon mounting region 42 so as to allow the position of the balloon envelope 18 to be monitored within the patient, via a visualization mechanism (Fluoroscope, etc.), during the performance of a REBOA procedure utilizing the assembly 10.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

As used herein terms such as "about" or "approximately" and the like when used to describe a measurement value attributed to any aspect of the occlusion assembly 10, or any of its components, such terms are provided so as to reflect the range of tolerances inherent in the production of a given article of manufacture or its assembly as understood by one of ordinary skill.

What is claimed is:

1. An occlusion assembly for occluding the aorta of a patient, comprising:
    a balloon envelope, the balloon envelope constructed from an elastomeric material, the balloon envelope defining an interior and an exterior, the balloon envelope having an as molded state, in the as molded state the balloon envelope has an ice cream cone shape, the balloon envelope having a longitudinal length extending between a proximal end and a distal end of the balloon envelope,
        a proximal tubular neck extends distally from the proximal end of the balloon envelope to a conical proximal shoulder section, a conical proximal taper section extends distally from the conical proximal shoulder section,
        a truncated conical distal blunt section extends distally from the conical proximal taper section and forms a juncture therewith,
        a conical distal shoulder section extends distally from the truncated conical distal blunt section to a distal tubular neck, the distal tubular neck terminating at the distal end of the balloon envelope,
        the juncture between the truncated conical distal blunt section and the conical proximal taper section defining a meridian, in the as molded state the meridian of the balloon envelope having a greater diameter than adjacent sections of the balloon envelope and the conical proximal taper section having a greater longitudinal length than that of the truncated conical distal blunt section; and
    an elongate shaft, the elongate shaft having a proximal shaft end, a distal shaft end, and a shaft length extending therebetween, the elongate shaft comprising:
        a wire, a proximal shaft region of a first material, a distal shaft region of a second material, and a balloon mounting region extending between the proximal shaft region and the distal shaft region,
        the wire extending the length of the elongate shaft with portions of the wire extending through the proximal shaft region, the balloon mounting region and the distal shaft region,
        the proximal shaft region defining an inflation lumen that extends from the proximal shaft end to the balloon mounting region, the portion of the wire extending through the proximal shaft region is positioned within the inflation lumen, the portion of the wire extending through the distal shaft region is adheringly engaged to the distal shaft region,
        the balloon mounting region having a length greater than the length of the balloon envelope in the molded state, the length of the balloon mounting region extending from a proximal bonding region located on a distal end of the proximal shaft region to a distal bonding region located on a proximal end of the distal shaft region;

the proximal end of the balloon envelope is bonded to the proximal bonding region and the distal end of the balloon envelope is bonded to the distal bonding region, the balloon envelope bonded to the elongate shaft has a longitudinally stretched state, wherein the length of the balloon envelope corresponds to the length of the balloon mounting region, the interior of the balloon envelope is in fluid communication with the inflation lumen.

2. The assembly of claim 1, wherein the balloon envelope bonded to the elongate shaft is inflatably transitional from and between a low inflation state, a partial inflation state, a fully inflated state, and an overinflated state, the conical distal shoulder section defines a conical distal shoulder section volume, the conical proximal shoulder section defines a conical proximal shoulder section volume, in the fully inflated state the conical distal shoulder section volume is less than the conical distal shoulder section volume in the partially inflated state, in the fully inflated state the conical proximal shoulder section volume is greater than the conical proximal shoulder section volume in the partially inflated state.

3. The assembly of claim 2, wherein in the partial inflation state the meridian has a first diameter and is located at a first distance from the distal shaft end, in the fully inflated state the meridian has a second diameter greater than the first diameter and is located at a second distance from the distal shaft end, the second distance is greater than the first distance.

4. The assembly of claim 3, wherein in the overinflated state the meridian maintains the same diameter as in the inflated state, the meridian is located at a third distance from the distal end of the balloon envelope, the third distance is less than the second distance.

5. The assembly of claim 1, further comprising:
a first radiopaque marker and a second radiopaque marker, the first radiopaque marker is engaged to the wire at a position distal to the proximal bonding region, and the second radiopaque marker is engaged to the wire at a position proximal to the distal bonding region.

6. The assembly of claim 1, further comprising a proximal hub, the proximal shaft portion is engaged to the hub and extends proximally therefrom, the hub defining an inflation port, the inflation port is in fluid communication with the inflation lumen.

7. The assembly of claim 6, wherein the wire has a proximal tip, the proximal tip is fixedly engaged to the hub.

8. The assembly of claim 1, wherein the length of the elongate shaft is not greater than 75 cm.

9. The assembly of claim 8, wherein the distal shaft region has a distal shaft region length of not greater than 8 cm, the distal shaft region defining an atraumatic J-tip at the distal shaft end, the atraumatic J-tip having a length of not greater than 5 cm.

10. The assembly of claim 9, further comprising a J-tip straightener, the J-tip straightener comprises a peel-off shaft and a user engagement tab affixed to the peel-off shaft, the peel-off shaft slidingly engaged to and removeably disposed about a portion the distal shaft region between the atraumatic J-tip and the distal end of the balloon envelope.

11. The assembly of claim 1, wherein the first material and the second material are both extruded polyether block amide, the first material having different material properties than the second material.

12. The assembly of claim 11, wherein the first material is PEBAX® and the second material is VESTAMIDE® EVERGLIDE® MED, and the elastomeric material is Urethane.

13. The assembly of claim 1, wherein the longitudinal length of the balloon envelope in the as molded state is approximately 70 mm and the diameter of the meridian is approximately 8 mm, the distal neck having a length of approximately 2 cm and the proximal neck having a length of approximately 10 cm, in the fully inflated state the diameter of the meridian is between about 20 mm and about 30 mm.

14. The assembly of claim 1, having an operational diameter of no more than 4 Fr.

15. The assembly of claim 1, further comprising visual markers, the visual markers located at specific areas on an external surface of the proximal shaft region, each of the visual markers indicating the distance the balloon envelope must be advanced into the aorta in order to be positioned at an anatomical zone corresponding to each of the visual markers.

16. The assembly of claim 1, wherein the ice crème cone shape of the balloon envelope is a self-similar shape.

17. An occlusion assembly for occluding the aorta of a patient, comprising:
a balloon envelope, the balloon envelope mounted on a shaft and adapted for inflation over a first range of volumes, said balloon envelope exhibiting a corresponding range of self-similar shapes over said first range of volumes.

* * * * *